Jan. 11, 1938.  C. F. IRISH  2,105,353

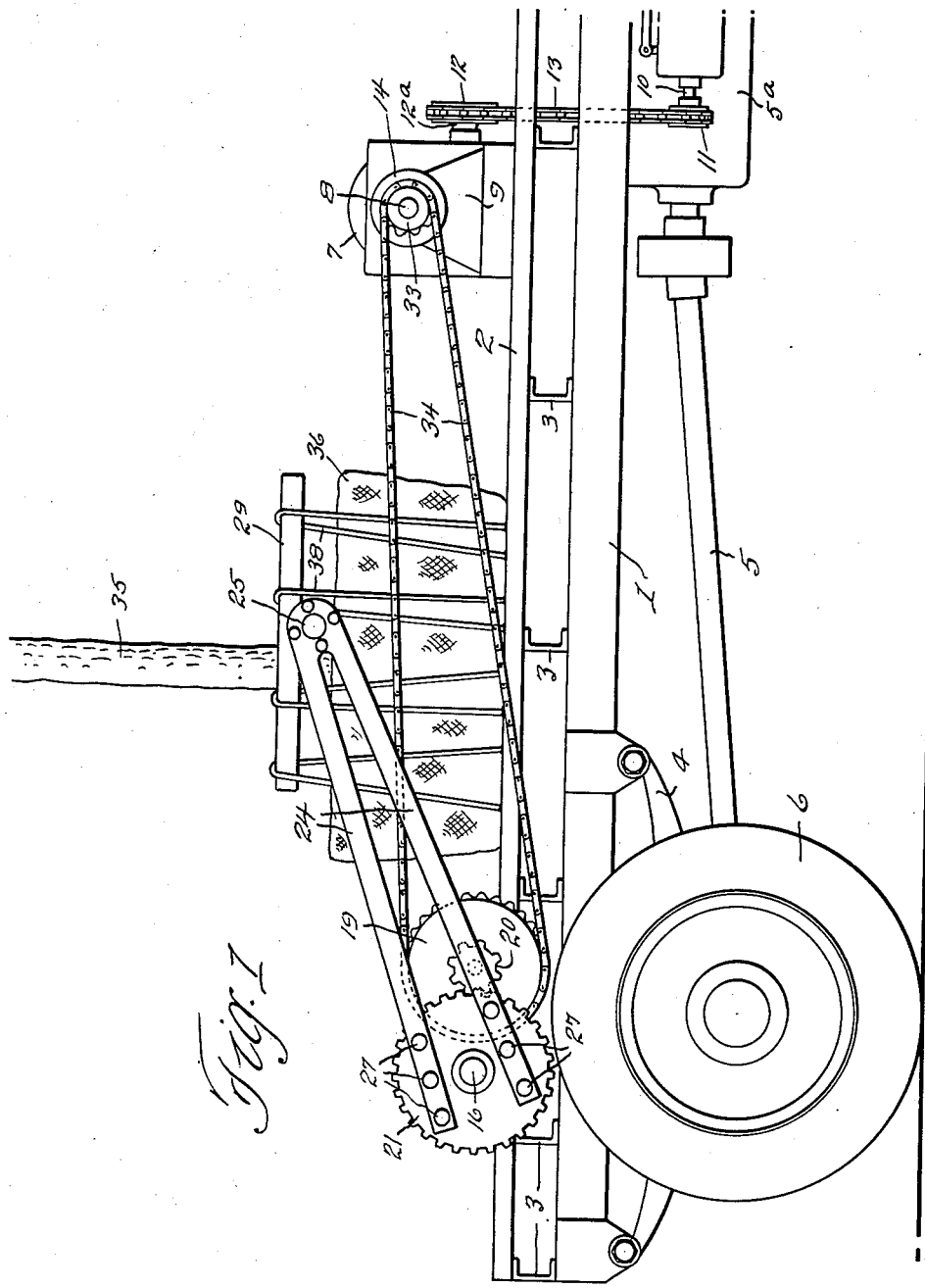

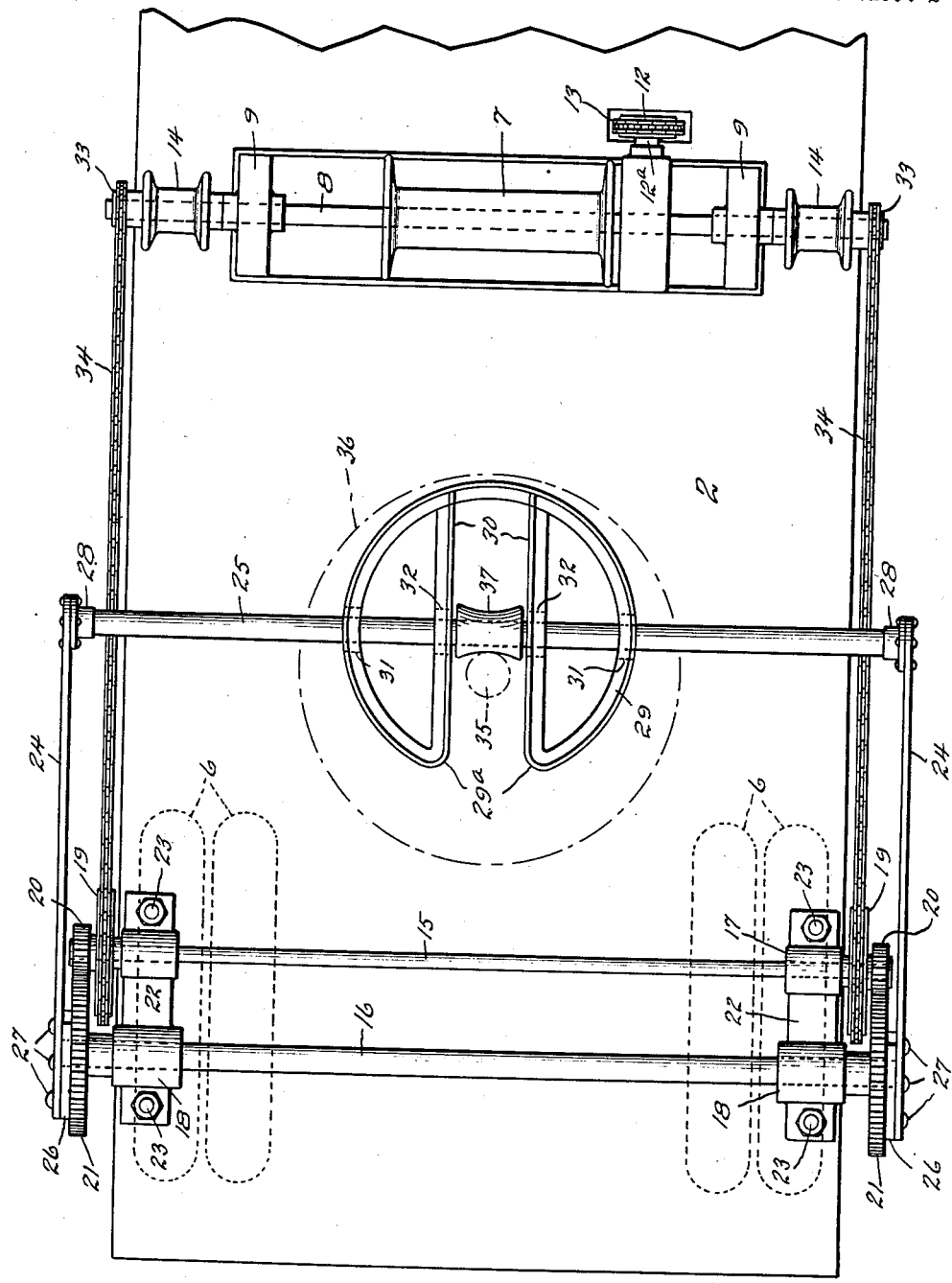

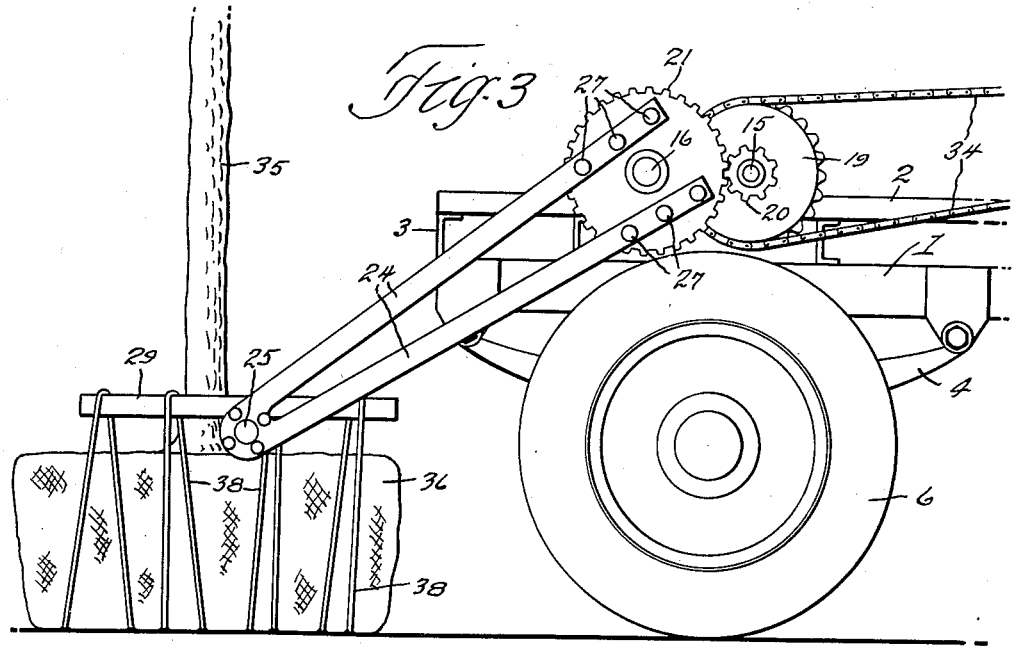
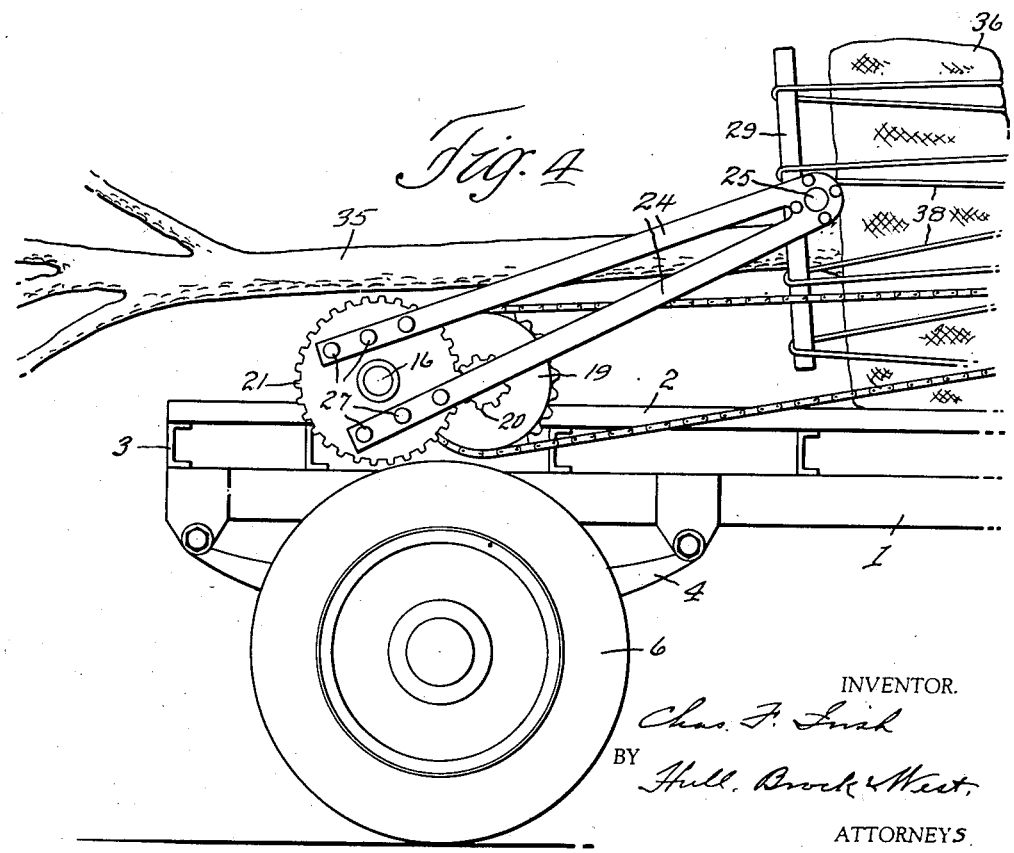

TREE LOADING AND UNLOADING MECHANISM

Filed Nov. 30, 1936  4 Sheets-Sheet 4

INVENTOR.
Chas. F. Irish
BY
Hull, Brock & West
ATTORNEYS

Patented Jan. 11, 1938

2,105,353

UNITED STATES PATENT OFFICE 2,105,353

TREE LOADING AND UNLOADING MECHANISM

Charles F. Irish, Bratenahl, Ohio

Application November 30, 1936, Serial No. 113,372

10 Claims. (Cl. 214—3)

This invention relates to vehicles for transporting trees, and more particularly to mechanism whereby the trees may be conveniently loaded upon and unloaded from such vehicles. It is the general purpose and object of the invention to provide vehicles such as trucks with mechanism of the character specified which will enable trees to be conveniently lifted and positioned upon the platforms thereof for transportation and to be conveniently removed from the platforms after having been transported to their respective destinations.

A still further object of the invention is to provide, for standard power-equipped trucks, tree loading mechanism which may be conveniently applied to and removed therefrom.

Figure 5:
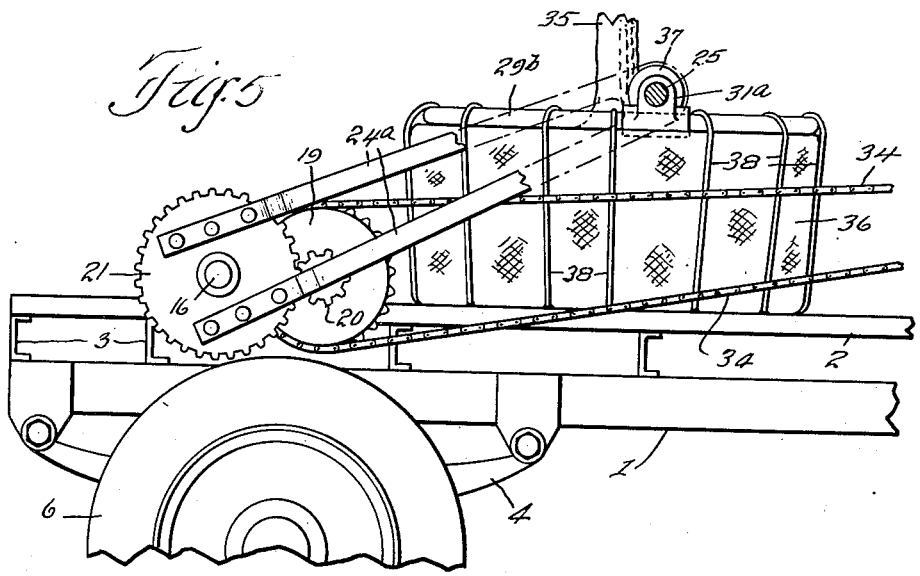

I accomplish the foregoing objects and other and more limited objects which will be specified hereinafter in and through the construction and arrangement of parts shown in the accompanying drawings, wherein Fig. 1 represents a side elevation of a portion of a truck having my mechanism applied thereto and showing a portion of a tree supported in upright position on the platform thereof; Fig. 2 a plan view of the truck shown in Fig. 1, the tree and root mass being indicated by dot-and-dash lines; Fig. 3 a detail in side elevation of the rear end portion of the truck illustrated in the preceding views and showing the positions of the various parts of my mechanism when connected to a tree and its root mass, prior to elevating the same upon the truck platform; Fig. 4 a view similar to Fig. 3 showing a tree supported upon the truck platform in a substantially horizontal position; Fig. 5 a view similar to Fig. 1 and showing a modification of the framework and a modification in the shape of the side members of the raising and lowering mechanism; and Fig. 6 a detail in plan of a portion of the mechanism shown in Fig. 5, the tree being indicated in dot-and-dash lines and the root mass being omitted.

Describing the various parts of Figs. 1 to 4 herein by reference characters, 1 denotes side members of a truck chassis and 2 the platform thereof, which is shown as supported from the chassis by cross beams 3. The truck is also shown as provided with the usual rear springs 4 and with a propeller shaft 5 for driving the truck through the rear axle and the rear wheels 6 thereof. The propeller shaft is driven through the usual transmission gearing (not shown) within the housing 5ª.

The truck shown herein is of the type having a standard power-driven winch mounted on the forward portion thereof, the said winch comprising a drum 7 mounted on a shaft 8 supported in journal boxes 9 with connections for driving it in opposite directions from the transmission gearing through a shaft 10, sprockets 11 and 12 and chain 13, the sprocket 12 being mounted on a shaft 12ª provided with a suitable pinion (not shown) meshing with a suitable gear (not shown) on the shaft 7. The shaft is shown as provided with niggerheads 14. The parts 7–14 inclusive are conventional in trucks of the type referred to and need no further description.

In order to equip trucks of this character for the loading, transportation, and unloading of trees, I have provided the following construction:—

Adjacent to the rear end of the platform 2 and located as closely as conveniently possible above the rear axle is a tree-handling attachment comprising the shafts 15 and 16, the bearings 17 and 18 therefor, the sprockets 19 and pinion 20 on opposite ends of the shaft 15, and the gears 21 on opposite ends of the shaft 16, with the tree elevating and lowering bail and yoke, which will be described in detail hereinafter.

The tree-elevating and lowering attachment is bolted directly to the platform, where the latter is made of metal, by means of plates 22 integral with the bearings 17 and 18 and bolts 23. Where the platform is made of wood, a metallic backing plate will be placed beneath the platform and beneath each plate 22 and the bolts will extend through said backing plates and be connected thereto by the usual nuts.

What I have termed the bail comprises substantially V-shaped, forked side members 24 and a cross rod 25 connecting the swinging ends of said members. The forked ends of the side members are secured to the gears 21 as by being riveted thereto through the backing plates 26, the rivets being indicated at 27. The opposite or swinging ends of the side members are provided with short sleeves 28 bolted thereto, said sleeves receiving the opposite ends of the cross rod 25 and the bail, the cross rod being swiveled in the said sleeves.

Pivotally mounted on the middle of the cross rod 25 is a yoke-frame by means of which the tree and its root mass may be connected to and suspended from the said rod. This yoke consists of an outer rim 29, preferably in the shape of a segment of a circle, the ends of the segment being spaced apart a sufficient distance to receive therebetween tree trunks of varying diameter. The ends 29ª of the segmental rim 29 are connected to the body of the rim by means of the parallel chord bars 30; and the yoke is pivotally mounted upon the cross rod 25 at substantially diametrically opposite points 31 of the segmental rim and through the central portions 32 of the chord bars 30. The parts 29, 29ᵃ and 30 are shown as being conveniently made of angle iron.

For the purpose of swinging the bail and its yoke into various operating positions, I provide the ends of the shaft 8 with sprockets 33, and these sprockets are connected to the sprockets 19 by means of chains 34.

It will be noted that the sprockets 33 are of materially less diameter than the sprockets 19, the size of these sprockets and the size of the pinions 20 and gears 21 being such as to produce the adequate power for handling trees and their root masses.

Figure 6:
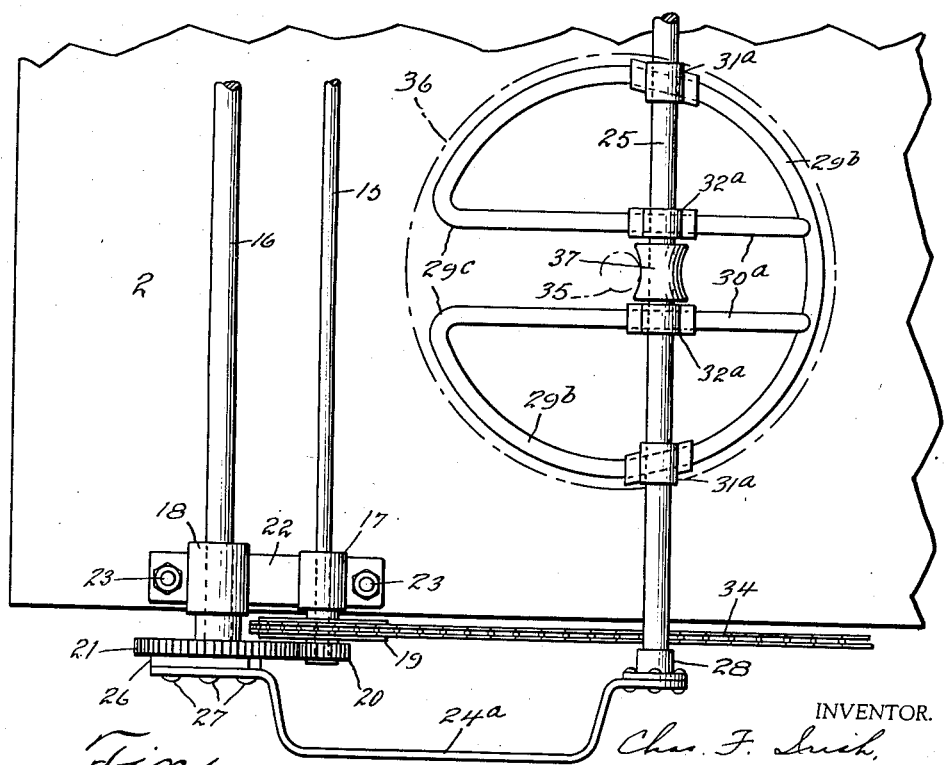

In Figs. 5 and 6, I have shown a modification of my invention which enables the yoke frame to be secured in direct contact with the upper surface of the root mass and which also enables the tree elevating and lowering framework to operate upon trees having root masses of larger diameters than can be handled by the framework shown in the preceding views. In Figs. 5 and 6, the parts which are duplicates of those appearing in the preceding views are identified by the same reference characters that appear on the preceding views. However, in order to accommodate trees having root masses of large diameter, the side members 24ᵃ are bowed outwardly between their ends, as is shown clearly in Fig. 6. Furthermore, in order to permit the yoke frame to be lashed in direct contact with the top of the root mass, the said framework is suspended from the cross bar 25; and, in order to bring the trunk of the tree substantially half way between the front and back of the yoke framework, the latter is mounted somewhat eccentrically upon the cross bar, the rear portions of the bars 30ᵃ being considerably longer than the front portions thereof. The yoke frame as shown in Fig. 5 is made of tubing, as distinguished from the angle iron construction employed in the preceding views; it includes the parallel bars 30ᵃ, the segmental outer rim 29ᵇ and the pivotal mountings 31ᵃ and 32ᵃ.

With the parts constructed and arranged as shown and described, it is believed that the operation will be readily understood. Assuming that a tree 35 has been dug, with the root mass 36 suitably covered with burlap or similar covering material, the bail and yoke will be swung downwardly at the rear of the truck, and the latter will be backed toward the tree so that the trunk may be received between the bars 30 or 30ᵃ and in engagement with the concave saddle 37 on the cross bar 25. The tree and the root mass will then be secured to the yoke frame by the slings 38. Power will then be applied to the mechanism and the tree and its root mass can be delivered upon the platform of the truck, either in the upright position shown in Figs. 1 and 5; or, if there be insufficient overhead clearance, due to the presence of such obstructions as trolley wires, the tree can be conveniently swung to the substantially horizontal position shown in Fig. 4, due to the pivotal mounting of the tree upon the cross bar 25.

If it is desired to use the truck for purposes other than the transportation of trees, the mechanism at the rear of the truck may be readily removed, together with the sprocket chains 34, thereby leaving the platform unobstructed throughout its length for the reception of loads of varying content.

It will be evident that my tree elevating and lowering attachment may be used with trucks having hand-operated winches; also that the said mechanism may be used for the purpose of lifting, loading and unloading objects other than trees. It will be obvious further that various changes may be made in the dimensions of the parts of the aforesaid mechanism but without departing from the spirit of my invention.

Having thus described my invention, what I claim is:

1. Tree handling mechanism comprising side members, a cross member uniting corresponding ends of said side members and a yoke pivotally mounted on said cross member and comprising a framework having a slotted opening for the reception of the trunks of trees, said yoke constituting means for securing the root mass of a tree thereto, and means for imparting rotary movement to the said arms thereby to bring the yoke into operative relation to a tree and its root mass and to enable it to deposit the tree and its root mass upon a suitable support.

2. Tree handling mechanism comprising a pair of side members, a cross member connecting corresponding ends of said side members, a framework mounted on said cross member and pivotally supported thereby with respect to said side members, the said framework having a slot extending thereinto for the reception of the trunk of a tree and a tree-engaging member at the bottom of said slot, said framework being pivotally supported by said cross member with respect to the said side members and providing means for suspending a root mass from the said cross member, and means for imparting rotary movement to the opposite ends of said side members thereby to deliver a tree and its root mass upon a suitable support.

3. Tree handling mechanism comprising a bail-like framework having side members and a cross bar, a yoke mounted on said bar and pivotally supported thereby with respect to said framework, the said yoke affording means for suspending a tree and its root mass from the said bar, means for supporting the side members of the said framework for rotation about a common axis and means for imparting rotary movement to said side members whereby the yoke may be moved into operative relation to a tree and its root mass and the tree and root mass be lifted thereby.

4. Tree handling mechanism comprising a pair of side members, a cross member connecting corresponding ends of said side members, a yoke framework mounted on said cross member and pivotally supported thereby with respect to said side members, the said yoke framework being in the shape of a segment of a circle having chord-like braces connecting the ends of the segment with the portion of the framework opposite said ends, said braces providing a slot therebetween for the reception of the trunk of a tree and being also mounted upon the cross member, there being a saddle mounted on said cross member between the said braces, the said yoke framework providing means for suspending a root mass from the said cross member, and means for imparting rotary movement to the opposite ends of said side members thereby to deliver a tree and its root mass upon a suitable support.

5. A tree raising and lowering attachment for vehicle platforms comprising in combination a shaft, side members having corresponding ends secured to said shaft to be rotated thereby, a cross member connecting the opposite ends of the said members, a slotted framework mounted on said cross member and pivotally supported thereby with respect to said side members, a gear on said shaft, a second shaft, a pinion thereon meshing with said gear, and means for detachably securing the shafts to the rear portion of the said platform.

6. The combination, with a platform, of tree loading and unloading mechanism comprising a bail-like frame having side members and a cross bar, a supporting framework mounted on said bar and pivotally supported thereby with respect to said side members, means for supporting the said framework and supporting framework upon said platform, the said frame affording means for suspending a tree and its root mass from the said cross bar, means for supporting the side members of the said frame for rotation about a common axis, and means for imparting rotary movement to said side members whereby the framework may be moved into operative relation to a tree and its root mass and the tree and root mass be transferred to and removed thereby from the said platform.

7. The combination, with a platform, of tree loading and unloading mechanism comprising a pair of side members, a cross member connecting corresponding ends of said side members, a yoke framework mounted on said cross member and pivotally supported thereby with respect to said side members, the said framework having braces providing a slot therebetween for the reception of the trunk of a tree, said framework constituting means for securing a root mass thereto, and means supported in operative relation to said platform for imparting rotary movement to the said side members thereby to deliver to and remove from the platform a tree and its root mass suspended from said framework.

8. In tree handling mechanism as claimed in claim 3, the yoke being pivotally supported beneath the cross bar.

9. A tree raising and lowering attachment for vehicle platforms comprising in combination a shaft, side members having corresponding ends secured to said shaft to be rotated thereby, a cross member connecting the opposite ends of the said members, a slotted framework mounted on said cross member and pivotally supported thereby with respect to said side members, and means for rotating said shaft in opposite directions, the said side members being bowed outwardly intermediate the ends thereof.

10. A tree raising and lowering attachment for vehicle platforms comprising in combination a shaft, side members having corresponding ends secured to said shaft to be rotated thereby, a cross member connecting the opposite ends of said members, a slotted framework mounted on said cross member and pivotally supported thereby with respect to said side members, and means for rotating said shaft in opposite directions.

CHARLES F. IRISH.